(12) United States Patent
Srivastava et al.

(10) Patent No.: US 11,864,093 B2
(45) Date of Patent: Jan. 2, 2024

(54) METHODS, SYSTEMS, AND COMPUTER READABLE MEDIA FOR COMMUNICATING DELEGATED NETWORK FUNCTION (NF) DISCOVERY RESULTS BETWEEN SERVICE COMMUNICATION PROXIES (SCPS) AND USING THE DELEGATED NF DISCOVERY RESULTS FOR ALTERNATE ROUTING

(71) Applicant: Oracle International Corporation, Redwood Shores, CA (US)

(72) Inventors: Ankit Srivastava, Uttar Pradesh (IN); Sridhar Karuturi, Raleigh, NC (US); Virendra Singh, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 173 days.

(21) Appl. No.: 17/569,319

(22) Filed: Jan. 5, 2022

(65) Prior Publication Data
US 2023/0217355 A1 Jul. 6, 2023

(51) Int. Cl.
*H04W 48/16* (2009.01)
*H04W 48/08* (2009.01)
*H04W 72/23* (2023.01)

(52) U.S. Cl.
CPC ........... *H04W 48/16* (2013.01); *H04W 48/08* (2013.01); *H04W 72/23* (2023.01)

(58) Field of Classification Search
None
See application file for complete search history.

(56) References Cited

U.S. PATENT DOCUMENTS

2021/0306326 A1* 9/2021 Bykampadi ......... H04L 63/0281
2022/0086734 A1* 3/2022 Aggarwal ........... H04L 63/0807

OTHER PUBLICATIONS

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

(Continued)

*Primary Examiner* — Hong S Cho
(74) *Attorney, Agent, or Firm* — Jenkins, Taylor & Hunt, P.A.

(57) ABSTRACT

A method for communicating delegated NF discovery results between SCPs and using the delegated NF discovery results for alternate SBI service request routing includes receiving, at a first SCP and from a consumer NF instance, an SBI service request. The method further includes determining that delegated NF discovery is required, and, in response, performing delegated NF discovery on behalf of the consumer NF instance. The method further includes receiving an NF discovery response including delegated NF discovery results. The method further includes sending the SBI service request including the delegated NF discovery results to a second SCP. The method further includes receiving, at a second SCP, the SBI service request including the delegated NF discovery results, forwarding the SBI service request towards a first producer NF instance selected by the first SCP, detecting failure of routing or processing of the SBI service request, and using the delegated NF discovery results for alternate routing of the SBI service request.

20 Claims, 6 Drawing Sheets

(56) References Cited

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

\* cited by examiner

METHODS, SYSTEMS, AND COMPUTER READABLE MEDIA FOR COMMUNICATING DELEGATED NETWORK FUNCTION (NF) DISCOVERY RESULTS BETWEEN SERVICE COMMUNICATION PROXIES (SCPS) AND USING THE DELEGATED NF DISCOVERY RESULTS FOR ALTERNATE ROUTING

TECHNICAL FIELD

The subject matter described herein relates to NF discovery operations in a communications network. More particularly, the subject matter described herein relates to methods, systems, and computer readable media for communicating delegated NF discovery results between SCPs and using the delegated NF discovery results for alternate routing of service based interface (SBI) service requests.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and provide contact and capacity information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the service communication proxy, and the service communication proxy load balances traffic among producer NF service instances that provide the required services or directly routes the traffic to the destination producer NF instances. The communications model where consumer NFs communicate with producer NFs via the SCP is referred to as the indirect communications model.

One additional operation that can be performed by the SCP is the NF discovery service operation. In order to trigger the SCP to perform an NF discovery service operation, a consumer NF sends a service based interface (SBI) request message to the SCP with one or more NF discovery headers in the service request. The NF discovery headers include parameters that indicate the type of service requested by the consumer NF. The presence of the NF discovery headers trigger the SCP to perform discovery on behalf of the consumer NF. Performing discovery on behalf of the consumer NF includes sending an NF discovery request to the NRF and receiving an NF discovery response with NF profiles matching the query parameters in the NF discovery request. The case where the SCP performs NF discovery on behalf of a consumer NF is referred to as delegated discovery.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that duplicate NF discovery service operations can be required in an indirect communications with delegated discovery scenario involving multiple SCPs. For example, a consumer NF may send an SBI service request to a local SCP, referred to herein as a consumer SCP. The SBI service request may include NF discovery headers, which causes the consumer SCP to perform delegated NF discovery on behalf of the consumer NF. In performing the delegated NF discovery, the SCP sends an NF discovery request to an NRF and receives a response to the NF discovery request including NF profiles of producer NFs that match query parameters in the NF discovery request.

After performing the delegated NF discovery, the consumer SCP selects a producer NF instance from the NF profiles in the NF discovery response and sends the SBI service request to the producer NF instance. The consumer SCP may select the producer NF instance based on relative priorities of the producer NF instances specified by the NF profiles. If the producer NF instance is in a region served by another SCP, referred to herein as the producer SCP, the consumer SCP sends the SBI service request to the producer SCP, and the producer SCP routes the SBI service request towards the producer NF instance selected by the consumer SCP.

If routing of the SBI service request between the producer SCP and the producer NF instance fails or if the producer NF instance experiences an error in processing the SBI service request, the producer SCP does not have the identities of alternate producer NF instances for providing the service requested by the SBI service request. As a result, the producer SCP performs NF discovery with the NRF to obtain the NF profiles of alternate producer NF instances capable of providing the service requested by the SBI service request, obtains the NF profiles, selects an alternate producer NF instance, and re-routes the SBI service request to the alternate producer NF instance. Requiring the producer SCP to perform NF discovery when the consumer SCP has already performed NF discovery is wasteful of network resources. For example, processing resources of the NRF and the producer SCP are unnecessarily utilized for performing duplicate NF discovery. In addition, the delay caused by the duplicate NF discovery adds latency to the time for providing the service to the consumer NF.

Accordingly, there exists a need for improved methods, systems and computer readable media for NF discovery and alternate routing that avoids at least some of these difficulties.

SUMMARY

A method for communicating delegated network function (NF) discovery results between service communication proxies (SCPs) and using the delegated NF discovery results for alternate service based interface (SBI) service request routing includes receiving, at a first SCP and from a consumer NF instance, an SBI service request. The method further includes determining, by the first SCP, that delegated NF discovery is required, and, in response, performing delegated NF discovery on behalf of the consumer NF instance. The method further includes receiving, by the first SCP, an NF discovery response including delegated NF discovery results. The method further includes sending, by the first SCP and to a second SCP, the SBI service request and including, in the SBI service request, the delegated NF discovery results. The method further includes receiving, at a second SCP, the SBI service request including the delegated NF discovery results, forwarding the SBI service request towards a first producer NF instance selected by the first SCP, detecting failure of routing or processing of the SBI service request, and using the delegated NF discovery results for alternate routing of the SBI service request.

According to another aspect of the subject matter described herein, receiving an SBI service request includes receiving an SBI service request including at least one 3gpp-Sbi-Discovery-* header, determining that delegated NF discovery is required includes detecting the at least one 3gpp-Sbi-Discovery-* header, and performing delegated NF discovery on behalf of the consumer NF includes generating an NF discovery request including parameters from the at least one 3gpp-Sbi-Discovery-* header and transmitting the NF discovery request to an NF repository function (NRF).

According to another aspect of the subject matter described herein, receiving an NF discovery response including the delegated NF discovery results includes receiving an NF discovery response with NF profiles of producer NF instances capable of providing a service requested by the SBI service request.

According to another aspect of the subject matter described herein, including the delegated NF discovery results in the SBI service request comprises including the NF profiles from the NF discovery response in the SBI service request.

According to another aspect of the subject matter described herein, including the NF profiles in the SBI service request comprises including the NF profiles in a list of discovered NF profiles header of the SBI service request.

According to another aspect of the subject matter described herein, including the NF profiles in the list of discovered NF profiles header of the SBI service request includes inserting an array of the NF profiles in the list of discovered NF profiles header of the SBI service request.

According to another aspect of the subject matter described herein, using the delegated NF discovery results for alternate routing of the SBI service request includes selecting a second producer NF instance using the NF profiles received from the first SCP in the SBI service request and transmitting the SBI service request to the second producer NF instance.

According to another aspect of the subject matter described herein, selecting the second producer NF instance includes selecting, by the second SCP, the second producer NF instance without performing NF discovery with an NF repository function (NRF).

According to another aspect of the subject matter described herein, selecting the second producer NF instance includes selecting the second producer NF instance based on priorities of the NF profiles received from the first SCP in the SBI service request.

According to another aspect of the subject matter described herein, detecting failure of routing or processing of the SBI service request includes detecting a response timeout or receiving an error response from the first producer NF instance.

According to another aspect of the subject matter described herein, a system for communicating delegated network function (NF) discovery results between service communication proxies (SCPs) and using the delegated NF discovery results for alternate service based interface (SBI) service request routing is provided. The system includes a first SCP including at least one processor for receiving, from a consumer NF instance, an SBI service request, determining, that delegated NF discovery is required, and, in response, performing delegated NF discovery on behalf of the consumer NF instance, receiving an NF discovery response including delegated NF discovery results, sending the SBI service request and including, in the SBI service request, the delegated NF discovery results. The system further includes a second SCP for receiving the SBI service request including the delegated NF discovery results, forwarding the SBI service request towards a first producer NF instance selected by the first SCP, detecting failure of routing or processing of the SBI service request, and using the delegated NF discovery results for alternate routing of the SBI service request.

According to another aspect of the subject matter described herein, the SBI service request includes at least one 3gpp-Sbi-Discovery-* header, the first SCP is configured to determine that delegated NF discovery is required by detecting the at least one 3gpp-Sbi-Discovery-* header, and to perform the delegated NF discovery on behalf of the consumer NF instance by generating an NF discovery request including parameters from the at least one 3gpp-Sbi-Discovery-* header and transmitting the NF discovery request to an NF repository function (NRF).

According to another aspect of the subject matter described herein, the delegated NF discovery results include NF profiles of producer NF instances capable of providing a service requested by the SBI service request.

According to another aspect of the subject matter described herein, the first SCP is configured to include the NF profiles from the NF discovery response in the SBI service request.

According to another aspect of the subject matter described herein, the first SCP is configured to include the NF profiles in a list of discovered NF profiles header of the SBI service request.

According to another aspect of the subject matter described herein, the first SCP is configured to insert an array of the NF profiles in the list of discovered NF profiles header of the SBI service request.

According to another aspect of the subject matter described herein, the second SCP is configured to use the delegated NF discovery results to perform the alternate routing by selecting a second producer NF instance using the NF profiles received from the first SCP in the SBI service request and transmitting the SBI service request to the second producer NF instance.

According to another aspect of the subject matter described herein, the second SCP is configured to select the second producer NF instance without performing NF discovery with an NF repository function (NRF).

According to another aspect of the subject matter described herein, the second SCP is configured to detect failure of routing or processing of the SBI service request by detecting a response timeout or receiving an error response from the first producer NF instance.

According to another aspect of the subject matter described herein, a non-transitory computer readable medium having stored thereon executable instructions that when executed by a processor of a computer control the computer to perform steps. The steps include receiving, at a first service communication proxy (SCP) and from a consumer network function (NF) instance, a service based interface (SBI) service request. The steps further include performing, by the first SCP, delegated NF discovery on behalf of the consumer NF instance. The steps further include receiving, by the first SCP, an NF discovery response including delegated NF discovery results. The steps further include generating and sending, by the first SCP and to a second SCP, an SBI service request and including, in the SBI service request, the delegated NF discovery results. The steps further include at the second SCP, receiving the SBI service request including the delegated NF discovery results, forwarding the SBI service request towards a producer NF instance selected by the first SCP, detecting failure of routing or processing of the SBI service request, and using the delegated NF discovery results for alternate routing of the SBI service request.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
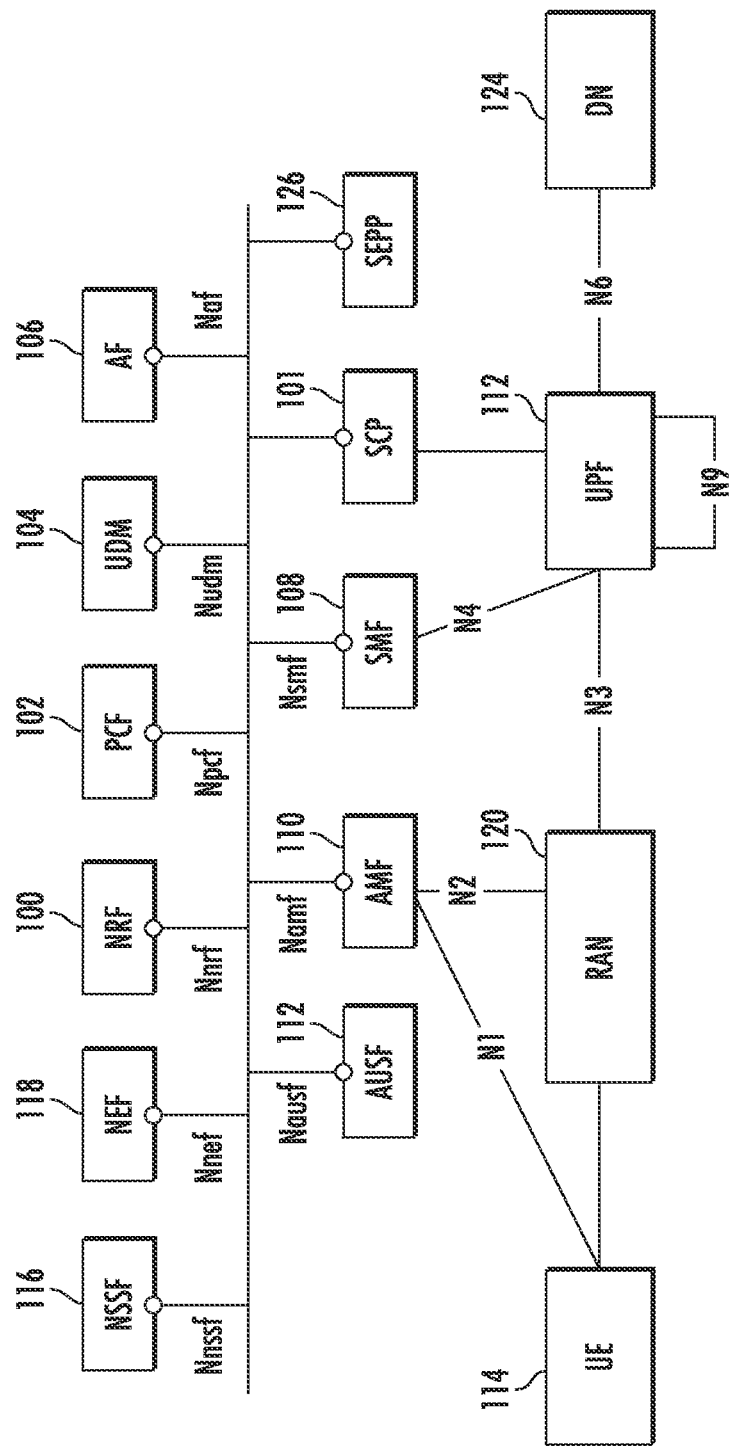
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a user defined management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
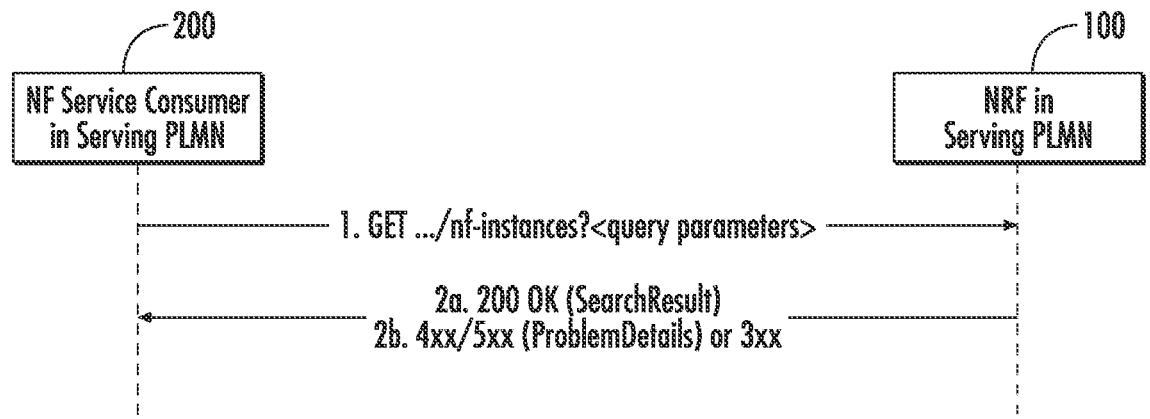
FIG. 2 is a message flow diagram illustrating exemplary messages exchanged in an NF discovery service operation.

As stated above, one problem that can occur in 5G and other networks is that duplicate NF discovery can be required by a producer SCP for the case of delegated NF discovery and alternate routing when routing of an SBI service request to a producer NF instance fails or processing of the SBI service request by the producer NF instance fails. FIG. 2 is a message flow diagram illustrating exemplary messages exchanged in the NF discovery service operation. Referring to FIG. 2, in line 1, an NF service consumer 200, which may be a consumer NF instance or an SCP, initiates the NF discovery service operation by sending an NF discovery request, which is an HTTP GET request, to a local NRF 100. The HTTP GET request includes query parameters that identify a type of service needed by NF service consumer 200. NRF 100 maintains a database of NF profiles of producer NF instances registered with NRF 100. NRF 100 uses the query parameters in the NF discovery request identify, in the NF profiles database, NF profiles of producer NF instances capable of providing the service needed by consumer NF instance 200.

If the processing of the NF discovery request is successful, NRF 100 generates and sends an NF discovery response, as indicated by the 200 OK message in line 2*a*, with results of the search in the NF profiles database. If the processing of the NF discovery request is not successful or the NF discovery request is redirected to another NRF, NRF 100 responds as indicated in line 2*b* with a 4*xx* or 5*xx* message with problem details or a 3*xx* message indicating redirection.

Figure 3:
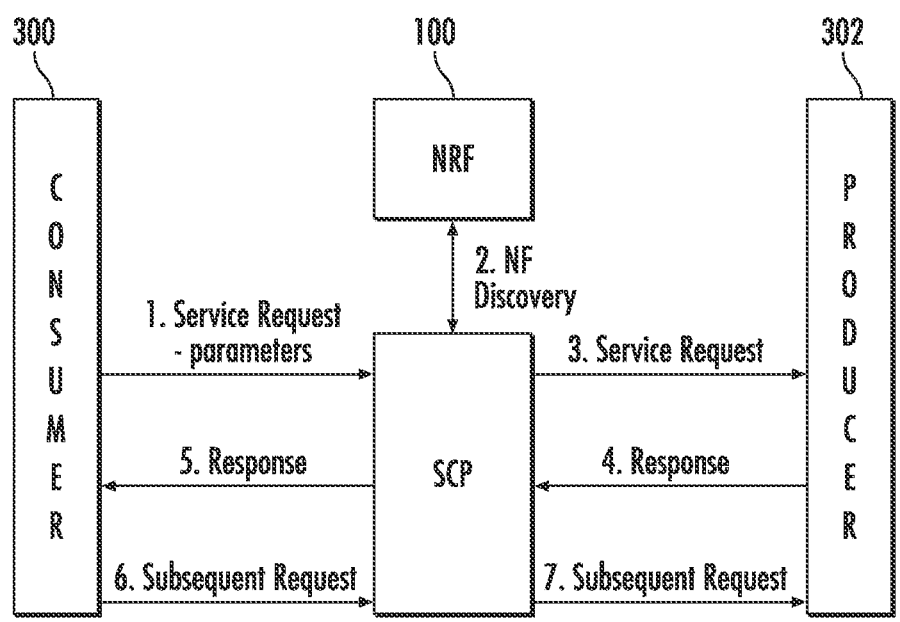
FIG. 3 is a diagram illustrating exemplary network functions and messages involved in indirect communications with delegated NF discovery according to 3GPP-defined model D.

In some instances an SCP performs delegated NF discovery on behalf of a consumer NF. The communications model where the SCP performs delegated NF discovery on behalf of a consumer NF is referred to as communications model D and is described in 3GPP TS 23.501. FIG. 3 is a network diagram illustrating exemplary network functions and messages involved in indirect communications with delegated discovery according to 3GPP communications model D. Referring to FIG. 3, in line 1, a consumer NF instance 300 sends an SBI service request with one or more NF discovery headers to SCP 101. In line 2, SCP 101 uses the parameters in the NF discovery headers to perform NF discovery with NRF 100. NRF 100 responds with the NF profiles of producer NF instances capable of providing the service requested by the service request. SCP 101 selects producer NF instance 302 to provide the service, and, in line 3, sends the service request to producer NF instance 302. In line 4, producer NF instance 302 sends a service response to SCP 101. In line 5, SCP 101 sends the service response to consumer NF instance 300.

In line 6, consumer NF instance 300 sends a subsequent request to producer NF 300 via SCP 101. In line 7, SCP 101 forwards the subsequent request to producer NF instance 302. As will be described in more detail below, if processing or routing of an SBI service request fails and multiple SCPs are involved, unnecessary NF discovery may be required to route the SBI service request to an alternate destination.

A network operating in model D of indirect communication may involve more than one SCP in the routing path when consumer and producer NFs are served by different SCPs. As per 3GPP TS 29.500, in model D of indirect communication, the consumer SCP performs delegated discovery using the discovery query parameters received in the 3gpp-Sbi-Discovery-* headers in an SBI service request received from a consumer NF instance. As per 3GPP TS 29.500, an SCP can forward the discovery query parameters received in the 3gpp-Sbi-Discovery-* headers to the next-hop SCP in the SBI service request transmitted to the next hop SCP. The consumer SCP sends the initial service request to the producer SCP with a 3gpp-Sbi-Target-Apiroot header containing the API root of the selected producer NF instance.

In the case of a routing failure of the initial service request at the producer SCP, for alternate routing, the producer SCP needs to perform producer NF discovery again and select an alternate producer NF instance. This is not an optimized routing behavior as the NF discovery procedure will have associated processing overhead and latency. As will be described in detail below, to avoid this difficulty, the consumer SCP may communicate a list of discovered NF profiles of producer NF instances to the producer SCP in a proprietary/custom header for alternate routing of an SBI service request whose processing or routing fails.

Figure 4:
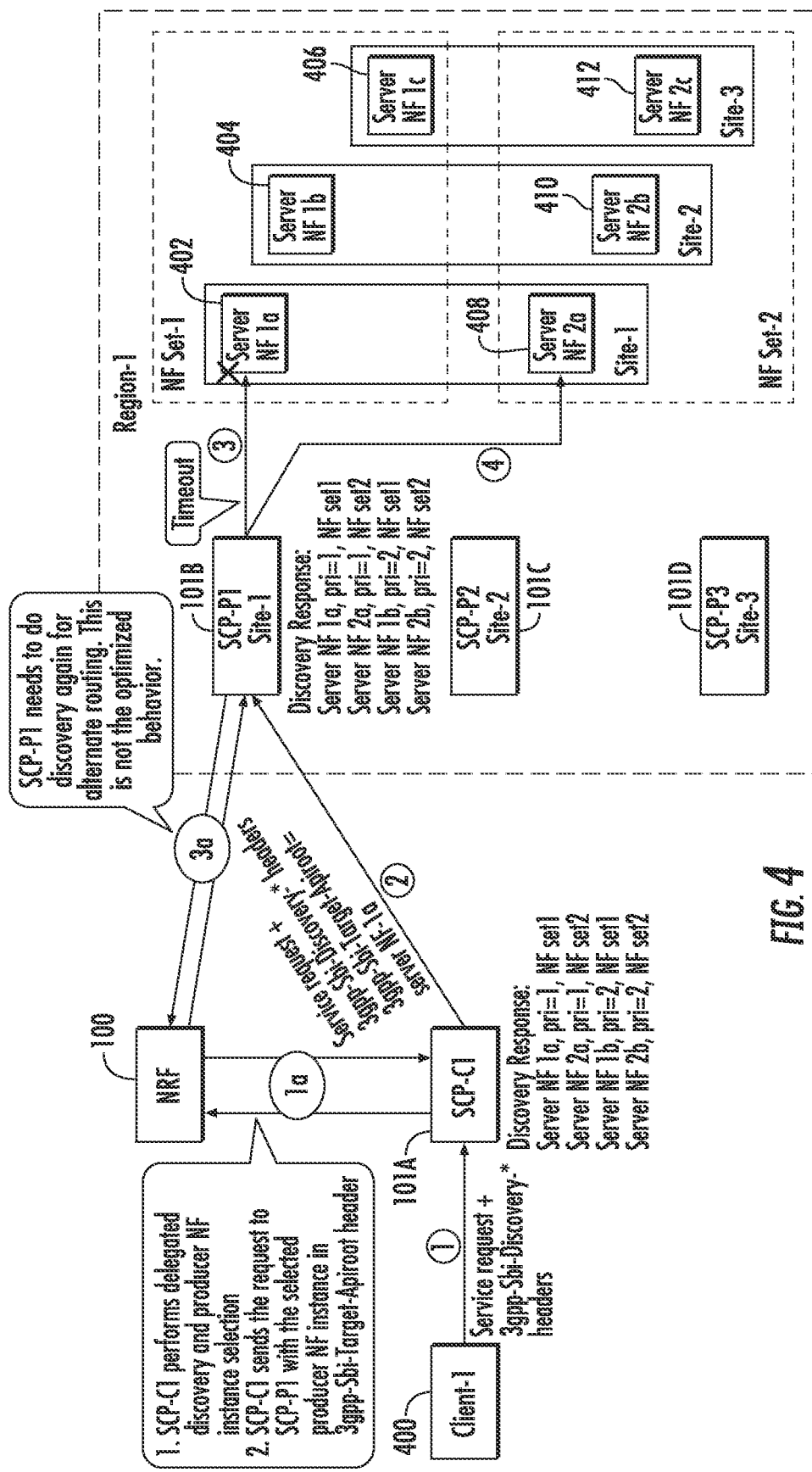
FIG. 4 is a message flow diagram illustrating exemplary messages exchanged when a consumer SCP performs delegated NF discovery, initial routing to a producer NF fails, and the producer SCP is required to perform an NF discovery operation for re-routing of the service request to an alternate producer NF.

FIG. 4 is a message flow diagram illustrating exemplary messages exchanged in a network that uses 3GPP communications model D where routing of the initial service request fails. Referring to FIG. 4, the network may include a client or consumer NF instance 400 and servers or producer NF instances 402, 404, 406, 408, 410, and 412. The network may include a consumer SCP, SCP-C1 101A, serving consumer NF instance 400. The network may further include producer SCPs, SCP-P1 101B and SCP-P2 101C, serving producer NF instances 402, 404, 406, 408, 410, and 412. Thus, service requests from consumer NF instance 400 to one of producer NF instances 402, 404, 406, 408, and 410 may be routed via consumer SCP, SCP-C1 101A, and one of producer SCPs, SCP-P1 101B or SCP-P2 101C. The network illustrated in FIG. 4 further includes NRF 100 for providing support for NF discovery and other Nnrf service operations.

Referring to the message flow in FIG. 4, in step 1, consumer NF instance 400 sends an SBI service request with NF discovery parameters carried in one or more 3gpp-Sbi-Discovery-* headers to SCP-C1 101A. SCP-C1 101A receives the SBI service request with the NF discovery query parameters, and, in step 1*a*, SCP-C1 101A performs NF discovery with NRF 100A based on the received NF discovery parameters. SCP-C1 101A receives, in an NF discovery response from NRF 100, NF profiles of producer NFs capable of providing the service identified by the NF discovery parameters. SCP-C1 101A uses the NF profiles learned from NRF 100A to select one of the producer NFs to provide the requested service.

In step 2, SCP-C1 101A selects producer NF instance 402 to process the SBI service request. Because producer NF instance 402 is served by producer SCP-P1 101B, SCP-C1 101A sends the service request to SCP-P1 101B. SCP-C1 101A includes the 3gpp-Sbi-Discovery-* headers and the 3gpp-Sbi-Target-Apiroot identifying producer NF instance 402. SCP-P1 101B receives the SBI service request and, in step 3, forwards the SBI service request to the producer NF identified in the 3gpp-Sbi-Target-Apiroot, which in the illustrated example, is producer NF instance 402.

Producer NF instance 402 in this example is either unable to process the service request or a routing failure occurs between producer SCP-P1 101B and producer NF instance 402. SCP-P1 101B detects a response timeout because a response is not received within the timeout period for the SBI service request. Ideally, SCP-P1 101B would select an alternate producer NF instance and re-route the SBI service request to the alternate producer NF instance. However, SCP-P1 101B does not have the discovery results (i.e., the NF profiles matching the parameters in the NF discovery headers) from the initial NF discovery performed by SCP-C1 101A to re-route the NF discovery request. Accordingly, in step 3a, SCP-P1 101B performs NF discovery with NRF 100A to identify an alternate producer NF instance to process the SBI service request. This discovery procedure delays the alternate routing by SCP-P1 101B. After receiving the NF discovery response, in step 4, SCP-P1 101B re-routes the NF discovery request to producer NF instance 408.

In order to avoid the difficulty illustrated in FIG. 4, the consumer SCP performs delegated discovery, learns the NF profiles of all eligible producer NF instances, including alternate producer NF instances for routing the initial request, and communicates the list of eligible producer NF instances, including the alternate producer NF instance information to the producer SCP. In one example, the consumer SCP includes a proprietary or custom header with the discovered producer NF profiles from the discovery response in the service request towards the producer SCP. The "list of discovered producer NF profiles" header contains the NF profiles of the alternate producer NF instances. The list of discovered producer NF profiles carried in the list of discovered producer NF profiles header may be an array: array(NFProfiles). In the case of an initial request routing or processing failure, the producer SCP selects, from the list of discovered producer NF profiles header received from the consumer SCP in the service request, an alternate producer NF instance for processing the SBI service request. The producer SCP may remove the list of discovered producer NF profiles header before sending the SBI request to the alternate producer NF instance.

Figure 5:
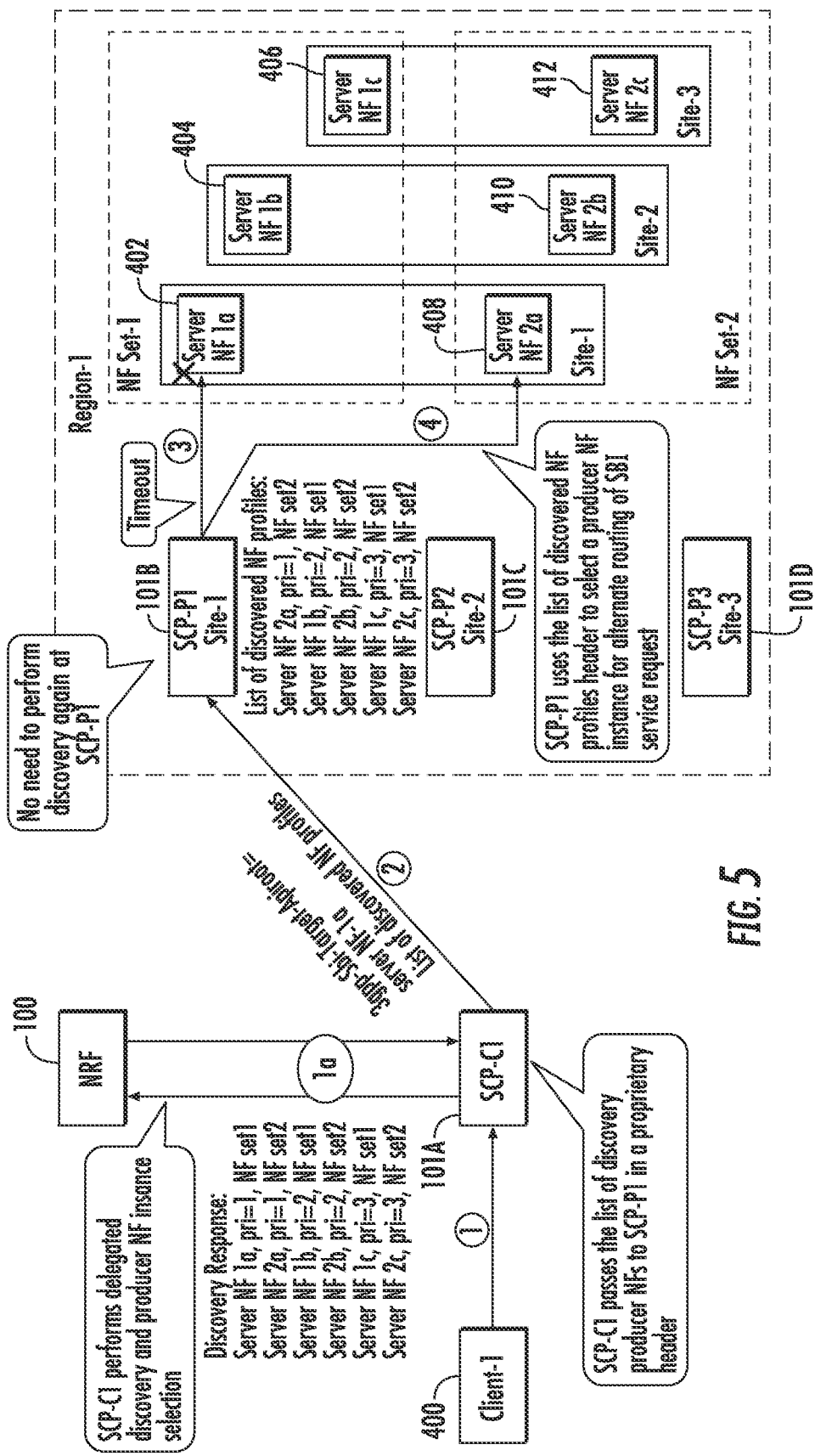
FIG. 5 is a message flow diagram illustrating exemplary messages exchanged when a consumer SCP performs delegated NF discovery, shares delegated NF discovery results with the producer SCP, initial routing to a producer NF instance fails, and the producer SCP uses the shared delegated NF discovery results to re-route the SBI service request to an alternate producer NF instance.

FIG. 5 is a message flow diagram illustrating exemplary messages exchanged when the consumer SCP communicates NF discovery results to the producer SCP and the producer SCP uses the NF discovery results for alternate routing. The network entities illustrated in FIG. 5 are the same as those illustrated in FIG. 4 except that consumer SCP-C1 101A is enhanced to communicate delegated NF discovery results to producer SCP-P1 101B, and producer SCP-P1 101B is enhanced to recognize and use the delegated NF discovery results for alternate routing of an SBI service request. Referring to the message flow in FIG. 5, in step 1, consumer NF instance 400 sends an SBI service request with NF discovery parameters carried in one or more 3gpp-Sbi-Discovery-* headers to SCP-C1 101A. SCP-C1 101A receives the SBI service request with the NF discovery parameters, and, in step 1a, SCP-C1 101A performs NF discovery with NRF 100 based on the received discovery parameters. SCP-C1 101A receives, in an NF discovery response from NRF 100, NF profiles of producer NF instances capable of providing the service identified by the NF discovery parameters. SCP-C1 101A uses the NF profiles learned from NRF 100A to select one of the producer NFs to provide the requested service.

In step 2, SCP-C1 101A selects producer NF instance 402 to process the SBI service request and sends the request to producer NF instance 402 via SCP-P1 101B. SCP-C1 101A includes NF discovery results in the list of discovered NF profiles header of the SBI service request. In step 3, SCP-P1 101B forwards the SBI service request to producer NF instance 402. Like the example illustrated in FIG. 4, processing or routing of the SBI service request fails. SCP-P1 101B detects the failure by the occurrence of a response timeout. Rather than repeating the NF discovery procedure, producer SCP-C1 101A selects one of the NF profiles in the array of NF profiles received from consumer SCP-C1 101A and routes the service request to the producer NF instance corresponding to the selected NF profile. In the illustrated example, SCP-P1 101B re-routes the SBI service request to producer NF instance 408. If routing or processing of the SBI service request by producer NF instance 408 fails, SCP-P1 101B can select, from the list of discovered NF profiles header received from SCP-C1 101A, an alternate producer NF instance to process the SBI service request. SCP-P1 101B may select the alternate producer NF instance based on the relative priorities of the NF profiles in the list of discovered NF profiles header received from SCP-C1 101B Thus, the solution illustrated in FIG. 5 reduces the likelihood of duplicate NF discovery in routing scenarios involving delegated discovery and multiple SCPs. Latency in performing alternate routing of the SBI service request is also reduced.

Figure 6:
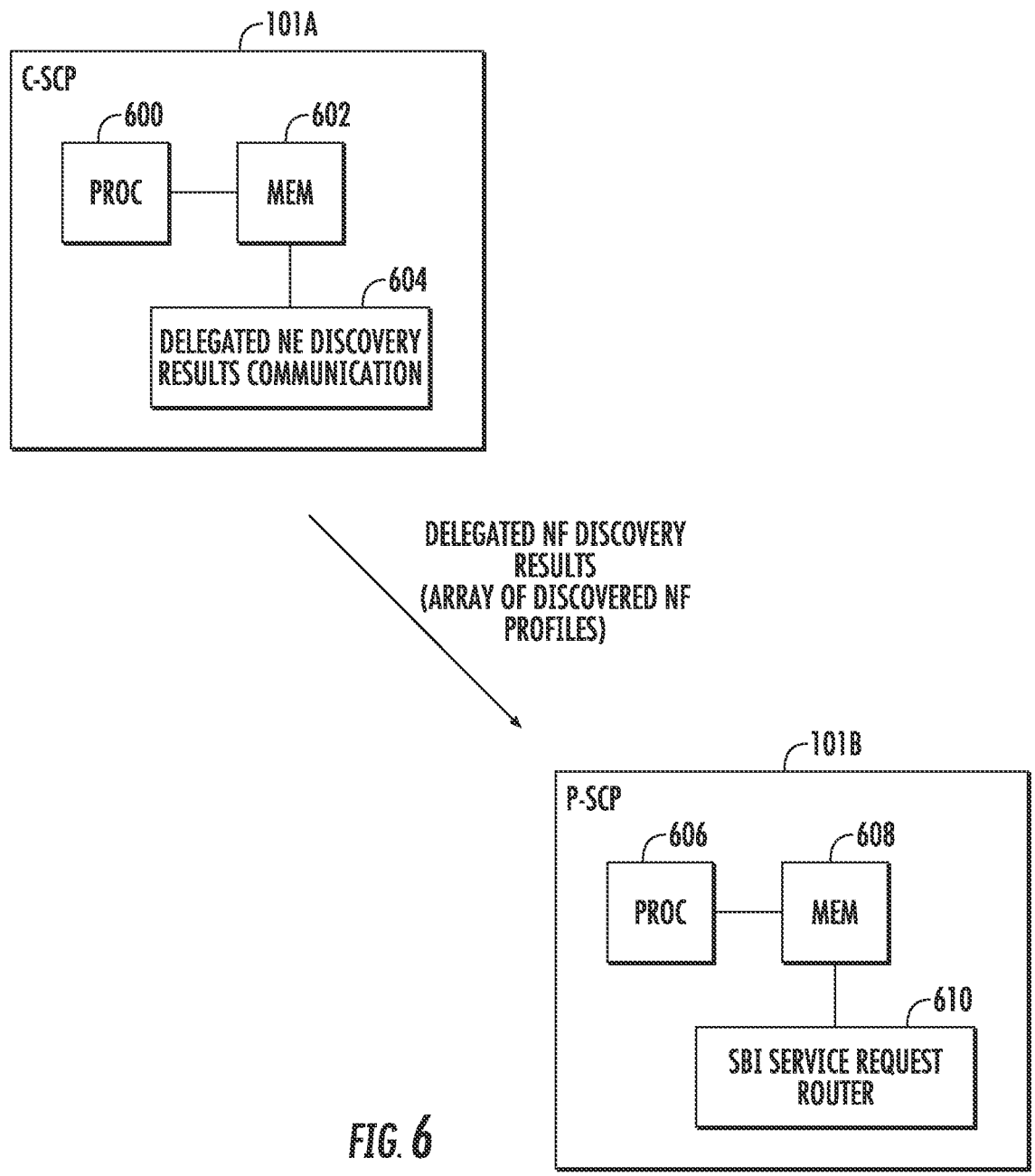
FIG. 6 is a block diagram illustrating an exemplary architecture for a consumer SCP and a producer SCP for sharing delegated NF discovery results and using the shared NF discovery results to perform alternate routing of an SBI service request.

FIG. 6 is a block diagram illustrating an exemplary architecture for a consumer SCP and a producer SCP for optimized alternate routing of SBI service requests using delegated NF discovery results communicated from the consumer SCP to the producer SCP. Referring to FIG. 6, consumer SCP 101A includes at least one processor 600 and a memory 602. Consumer SCP 101A further includes a delegated NF discovery results communicator 604 that creates the custom header including the array of discovered NF profiles and adds the header to outbound SBI service requests sent to producer SCPs. Delegated NF discovery results communicator 604 may be implemented using computer executable instructions stored in memory 602 and executed by processor 600.

Producer SCP 101B also includes at least one processor 606 and a memory 608. Producer SCP 101B further includes an SBI service request router 610 for routing SBI service requests to producer NFs. SBI service request router 610 may also receive SBI service requests, read delegated NF discovery results from the SBI service requests and store the delegated NF discovery results in memory 608. SBI service request router 610 may detect an SBI response timeout when processing or routing of an SBI service request fails. When this occurs, SBI service request router 610 may access delegated NF discovery results stored in memory 608, select, from the delegated NF discovery results, an alternate producer NF instance for processing the SBI service request, and re-route the SBI service request to the selected producer NF instance. SBI service request router 610 may, in one example, be implemented using computer executable instructions stored in memory 608 and executed by processor 606.

Figure 7:
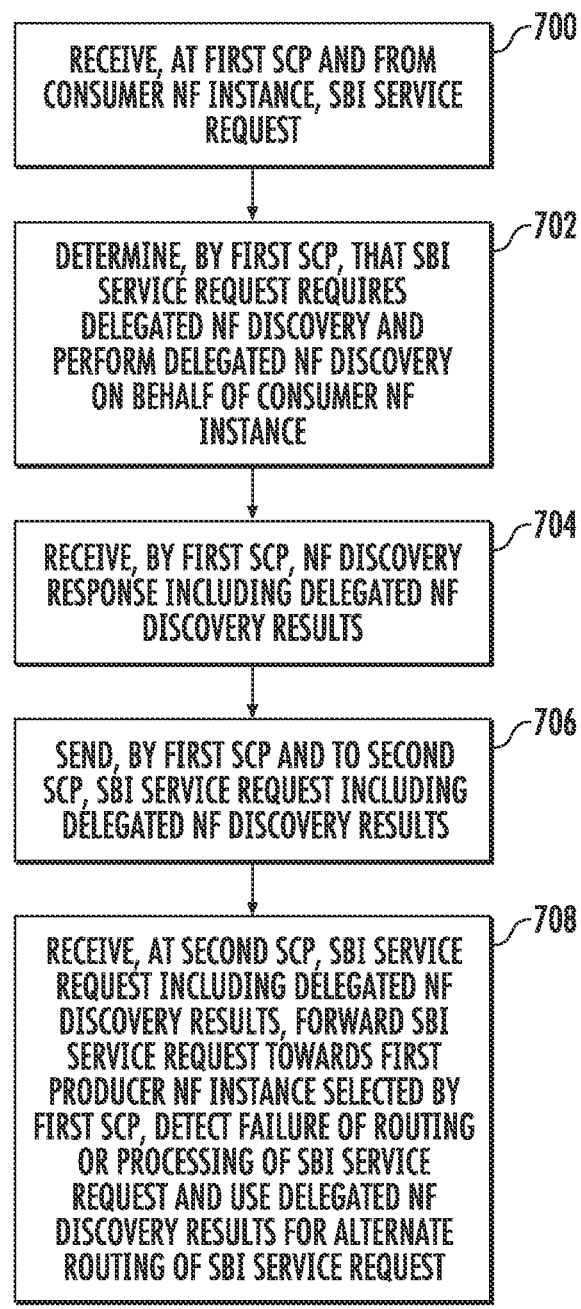
FIG. 7 is a flow chart illustrating an exemplary process for sharing delegated NF discovery results and using the shared delegated NF discovery results to perform alternate routing of an SBI service request.

FIG. 7 is a flow chart illustrating an exemplary process performed by a consumer SCP and a producer SCP for optimized alternate routing of SBI service requests using delegated NF discovery results communicated from the consumer SCP to the producer SCP. Referring to FIG. 7, in step 700, the process includes receiving, at a first SCP and from a consumer NF instance, an SBI service request. For example, an SCP, such as SCP-C1 101A may receive an SBI service request from a consumer NF instance served by SCP-C1 101A.

In step 702, the process includes determining, by the first SCP, that the SBI service request requires delegated NF discovery, and, in response, performing, by the first SCP, delegated NF discovery on behalf of the consumer NF instance. For example, SCP-C1 101A may detect the presence of one or more NF discovery headers in the SBI service request and, in response to detecting the presence of the NF discovery headers, determine that delegated NF discovery is required. SCP-C1 101A may then perform the delegated NF discovery by sending an NF discovery request using query parameters from the NF discovery headers to NRF 100.

In step 704, the process includes receiving, by the first SCP, an NF discovery response including delegated NF discovery results. For example, SCP-C1 101A may receive an NF discovery response from NRF 100 including NF profiles of producer NF instances capable of providing the service identified by the query parameters in the NF discovery request.

In step 706, the process includes generating and sending, by the first SCP and to a second SCP, the SBI service request and including, in the SBI service request, the delegated NF discovery results. For example, SCP-C1 101A may create the list of discovered NF profiles header including the NF profiles discovered in the delegated NF discovery service operation and include the header in the SBI service request. SCP-C1 101A may forward the SBI service request towards one of the producer NF instances whose NF profiles were discovered in the delegated NF discovery service operation.

In step 708, the process includes, receiving, at a second SCP, the SBI service request including the delegated NF discovery results, forwarding the SBI service request towards a first producer NF instance selected by the first SCP, detecting failure of routing or processing of the SBI service request, and using the delegated NF discovery results for alternate routing of the SBI service request. For example, an SCP associated with the producer NF instance, such as SCP-P1 101B, may receive the SBI service request and forward the request to the producer NF instance identified in the 3gpp-Sbi-target-Apiroot of the SBI service request. SCP-P1 101B may detect that the routing or processing of the SBI service request fails, for example, by detecting a response timeout or receiving an error response from the producer NF instance. Upon detecting that routing or processing of the SBI service request fails, SCP-P1 101B may select, from the NF profiles in the list of discovered NF profiles header, the NF profile of an alternate producer NF instance for processing the SBI service request and re-route the SBI service request to the selected producer NF instance. It should be noted that SCP-P1 101B is able to select the alternate producer NF instance for processing the SBI service request without performing NF discovery.

Exemplary advantages of the subject matter described herein include optimized handling of the alternate routing scenario for SBI service requests. Another advantage is an improvement in latency for alternate routing scenarios by avoiding an unnecessary NF discovery procedure at the producer SCP. SCP performance is also improved by avoiding the unnecessary NF discovery at the producer SCP.

The disclosure of each of the following references is incorporated herein by reference in its entirety.

REFERENCES

1. $3^{rd}$ Generation Partnership Project; Technical Specification Group Core Network and Terminals; 5G System; Network Function Repository Services; Stage 3 (Release 17) 3GPP TS 29.510 V17.3.0 (2021-09)
2. $3^{rd}$ Generation Partnership Project; Technical Realization of the Service Based Architecture; Stage 3 (Release 17) 3GPP TS 29.500 V17.4.0 (2021-09)
3. $3^{rd}$ Generation Partnership Project; Technical Specification Group Services and System Aspects; System architecture for the 5G System (5GS); Stage 2 (Release 17) 3GPP TS 23.501 V17.2.0 (2021-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for communicating delegated network function (NF) discovery results between service communication proxies (SCPs) and using the delegated NF discovery results for alternate service based interface (SBI) service request routing, the method comprising:
   receiving, at a first SCP and from a consumer NF instance, an SBI service request;
   determining, by the first SCP, that delegated NF discovery is required, and, in response, performing delegated NF discovery on behalf of the consumer NF instance;
   receiving, by the first SCP, an NF discovery response including delegated NF discovery results;
   sending, by the first SCP and to a second SCP, the SBI service request and including, in the SBI service request, the delegated NF discovery results; and
   receiving, at a second SCP, the SBI service request including the delegated NF discovery results, forwarding the SBI service request towards a first producer NF instance selected by the first SCP, detecting failure of routing or processing of the SBI service request, and using the delegated NF discovery results for alternate routing of the SBI service request.

2. The method of claim 1 wherein receiving an SBI service request includes receiving an SBI service request including at least one 3gpp-Sbi-Discovery-* header, determining that delegated NF discovery is required includes detecting the at least one 3gpp-Sbi-Discovery-* header, and performing delegated NF discovery on behalf of the consumer NF includes generating an NF discovery request including parameters from the at least one 3gpp-Sbi-Discovery-* header and transmitting the NF discovery request to an NF repository function (NRF).

3. The method of claim 1 wherein receiving an NF discovery response including the delegated NF discovery results includes receiving an NF discovery response with NF profiles of producer NF instances capable of providing a service requested by the SBI service request.

4. The method of claim 3 wherein including the delegated NF discovery results in the SBI service request comprises including the NF profiles from the NF discovery response in the SBI service request.

5. The method of claim 4 wherein including the NF profiles in the SBI service request comprises including the NF profiles in a list of discovered NF profiles header of the SBI service request.

6. The method of claim 5 wherein including the NF profiles in the list of discovered NF profiles header of the SBI service request includes inserting an array of the NF profiles in the list of discovered NF profiles header of the SBI service request.

7. The method of claim 4 using the delegated NF discovery results for alternate routing of the SBI service request includes:
  selecting a second producer NF instance using the NF profiles received from the first SCP in the SBI service request; and
  transmitting the SBI service request to the second producer NF instance.

8. The method of claim 7 wherein selecting the second producer NF instance includes selecting, by the second SCP, the second producer NF instance without performing NF discovery with an NF repository function (NRF).

9. The method of claim 7 wherein selecting the second producer NF instance includes selecting the second producer NF instance based on priorities of the NF profiles received from the first SCP in the SBI service request.

10. The method of claim 1 wherein detecting failure of routing or processing of the SBI service request includes detecting a response timeout or receiving an error response from the first producer NF instance.

11. A system for communicating delegated network function (NF) discovery results between service communication proxies (SCPs) and using the delegated NF discovery results for alternate service based interface (SBI) service request routing, the system comprising:
  a first SCP including at least one processor for receiving, from a consumer NF instance, an SBI service request, determining, that delegated NF discovery is required, and, in response, performing delegated NF discovery on behalf of the consumer NF instance, receiving an NF discovery response including delegated NF discovery results, sending the SBI service request and including, in the SBI service request, the delegated NF discovery results; and
  a second SCP for receiving the SBI service request including the delegated NF discovery results, forwarding the SBI service request towards a first producer NF instance selected by the first SCP, detecting failure of routing or processing of the SBI service request, and using the delegated NF discovery results for alternate routing of the SBI service request.

12. The system of claim 11 wherein the SBI service request includes at least one 3gpp-Sbi-Discovery-* header, the first SCP is configured to determine that delegated NF discovery is required by detecting the at least one 3gpp-Sbi-Discovery-* header, and to perform the delegated NF discovery on behalf of the consumer NF instance by generating an NF discovery request including parameters from the at least one 3gpp-Sbi-Discovery-* header and transmitting the NF discovery request to an NF repository function (NRF).

13. The system of claim 11 wherein the delegated NF discovery results include NF profiles of producer NF instances capable of providing a service requested by the SBI service request.

14. The system of claim 13 wherein the first SCP is configured to include the NF profiles from the NF discovery response in the SBI service request.

15. The system of claim 14 wherein the first SCP is configured to include the NF profiles in a list of discovered NF profiles header of the SBI service request.

16. The system of claim 15 wherein the first SCP is configured to insert an array of the NF profiles in the list of discovered NF profiles header of the SBI service request.

17. The system of claim 14 the second SCP is configured to use the delegated NF discovery results to perform the alternate routing by:
  selecting a second producer NF instance using the NF profiles received from the first SCP in the SBI service request; and
  transmitting the SBI service request to the second producer NF instance.

18. The system of claim 17 wherein the second SCP is configured to select the second producer NF instance without performing NF discovery with an NF repository function (NRF).

19. The system of claim 11 wherein the second SCP is configured to detect failure of routing or processing of the SBI service request by detecting a response timeout or receiving an error response from the first producer NF instance.

20. A non-transitory computer readable medium having stored thereon executable instructions that when executed by a processor of a computer control the computer to perform steps comprising:
  receiving, at a first service communication proxy (SCP) and from a consumer network function (NF) instance, a service based interface (SBI) service request;
  performing, by the first SCP, delegated NF discovery on behalf of the consumer NF instance;
  receiving, by the first SCP, an NF discovery response including delegated NF discovery results;
  generating and sending, by the first SCP and to a second SCP, an SBI service request and including, in the SBI service request, the delegated NF discovery results;
  at the second SCP, receiving the SBI service request including the delegated NF discovery results, forwarding the SBI service request towards a producer NF instance selected by the first SCP, detecting failure of routing or processing of the SBI service request, and using the delegated NF discovery results for alternate routing of the SBI service request.

* * * * *